(12) United States Patent
Yoshizuru (10) Patent No.: US 9,579,726 B2
(45) Date of Patent: Feb. 28, 2017

(54) PEELING MACHINE

(71) Applicant: Daisho Seiki Corporation, Ikeda-shi, Osaka (JP)

(72) Inventor: Shoji Yoshizuru, Ikeda (JP)

(73) Assignee: Daisho Seiki Corporation, Ikeda-shi (JP)

( * ) Notice: Subject to any disclaimer, the term of this patent is extended or adjusted under 35 U.S.C. 154(b) by 408 days.

(21) Appl. No.: 14/255,496

(22) Filed: Apr. 17, 2014

(65) Prior Publication Data

US 2014/0311362 A1 Oct. 23, 2014

(30) Foreign Application Priority Data

Apr. 22, 2013 (JP) ................................. 2013-089635

(51) Int. Cl.
*B23B 5/12* (2006.01)
*A47J 17/16* (2006.01)

(52) U.S. Cl.
CPC .................. *B23B 5/12* (2013.01); *A47J 17/16* (2013.01); *Y10T 83/6497* (2015.04)

(58) Field of Classification Search
CPC ............... Y10T 83/647; Y10T 83/6476; Y10T 83/6489; Y10T 83/6497; Y10T 82/00; Y10T 82/26; Y10T 82/27; Y10T 82/15; Y10T 82/16426; Y10T 82/16442; A47J 17/16; A47J 17/00; B23B 5/12; B23B 5/08

See application file for complete search history.

(56) References Cited

U.S. PATENT DOCUMENTS

| | | | |
|---|---|---|---|
| 3,363,493 A | 1/1968 | Riedel | |
| 3,677,114 A * | 7/1972 | Brochard | B23B 5/12 82/127 |
| 3,791,564 A | 2/1974 | Hugonin | |
| 4,074,598 A | 2/1978 | Weck | |
| 4,759,361 A * | 7/1988 | Gallop | G03B 42/025 378/163 |
| 5,009,136 A * | 4/1991 | Glomb | B23B 5/12 409/167 |
| 5,303,621 A | 4/1994 | Horlitz et al. | |
| 6,125,731 A * | 10/2000 | Seto | B23Q 5/40 74/89.31 |

FOREIGN PATENT DOCUMENTS

| | | |
|---|---|---|
| DE | 1 252 036 B | 10/1967 |
| DE | 25 31 320 C3 | 1/1977 |
| DE | 26 51 174 B2 | 5/1978 |
| JP | 4-226803 A | 8/1992 |

* cited by examiner

*Primary Examiner* — Phong Nguyen
(74) *Attorney, Agent, or Firm* — Crowell & Moring LLP (57) ABSTRACT

A peeling machine according to the present invention includes a cutter head and a feed mechanism having upper and lower feed rollers, and the feed mechanism includes a first holder that supports the lower feed roller, a second holder that supports the upper feed roller, a roller opening/closing driving mechanism, a synchronizing mechanism that has a pinion disposed in the same vertical plane as axes of the both feed rollers and first and second racks, and a grasping-force applying cylinder that applies a downward work grasping force to the second holder.

3 Claims, 8 Drawing Sheets

PEELING MACHINE

BACKGROUND OF INVENTION

1. Field of the Invention

The present invention relates to a peeling machine for continuously cutting the outer peripheral surface of a round rod-like work, and in particular, to a feed mechanism for feeding the work to a cutter head.

2. Description of the Prior Art

Generally, a peeling machine includes a cutter head that rotates about a substantially horizontal mechanical center line to cut the outer peripheral surface of a round rod-like work, and a feed mechanism that holds the work on the mechanical center line between upper and lower feed rollers and feeds the work to the cutter head.

Figure 8:
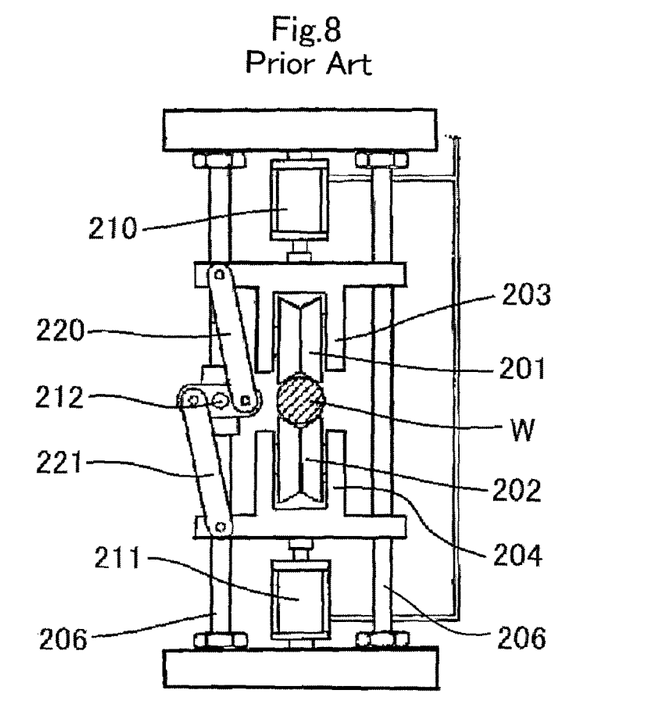
FIG. 8 is a schematic vertical sectional view of a conventional example.

Japanese Unexamined Patent Publication No. H4 (1992)-226803 discloses various feed mechanisms for conventional peeling machines, and FIG. 8 shows one of the feed mechanisms. In FIG. 8, the feed mechanism includes a pair of upper and lower feed rollers 201, 202 that hold a round rod-like work W therebetween, and holders 203, 204 for supporting the feed rollers 201, 202, respectively, are supported by vertical respective guide rods 206, 206 so as to be vertically movable and to be driven by cylinders 210, 211, respectively. A synchronizing mechanism that moves the upper and lower holders 203, 204 in synchronization with each other is configured of a rocker lever 212, and a pair of connecting rods 220, 221 for connecting both ends of the rocker lever 212 to the upper and lower holders 203, 204.

With the configuration shown in FIG. 8, the synchronizing mechanism can change the position of the upper and lower feed rollers 201, 202 symmetrically in the vertical direction according to the works W having different diameters, thereby accurately holding the concerned work. Japanese Unexamined Patent Publication No. H4 (1992)-226803 also discloses a structure using a pair of upper and lower angle lever, as another example of the synchronizing mechanism.

In the feed mechanism shown in FIG. 8, the cylinders 210, 211 vertically move the holders 203, 204 for opening/closing the feed rollers 201, 202, and a grasping force to finally grasp the work W is derived from expansion/contraction of the cylinders 210, 211. That is, opening/closing of the upper and lower feed rollers 201, 202, positioning of the feed rollers 201, 202 with respect to the work, and grasping of the work with a predetermined pressure are all made by only controlling expansion/contraction of the cylinders 210, 211. However, with such configuration, it is difficult to rapidly open/close the feed rollers 201, 202, accurately position the feed rollers 201, 202, and grasp the work with an appropriate grasping force according to the diameter of the work. In other words, when the moving speed of the upper and lower holders is increased to improve the working efficiency, it becomes difficult to accurately position the feed rollers 201, 202, and suitably grasp the work with the appropriate grasping force according to the type of the work. Conversely, when the moving speed of the holders is decreased to enable grasping of the work with the appropriate grasping force according to the type of the work, working time increases, lowering the working efficiency.

When the grasping force with respect to the work is small, slippage between the work and the feed rollers occurs, inhibiting stable feeding. Conversely, when the grasping force with respect to the work is too large, for example, non-slip protrusions on the outer peripheral surfaces of the feed rollers may cause a transfer flaw on the surface of the work. Especially in cutting a soft material such as aluminum, the transfer flaw is likely to occur. Other feed mechanisms disclosed in Patent document 1 cause a similar problem.

SUMMARY OF THE INVENTION

The present invention is devised in consideration of the above-mentioned problem, and its object is to provide a peeling machine provided with a feed mechanism capable of opening/closing the upper and lower feed rollers and positioning the feed rollers with respect to the work rapidly and accurately, as well as setting the grasping force with respect to works having different diameters to an appropriate pressure.

To attain the object, according to the present invention, in a peeling machine including: a cutter head configured to rotate about a substantially horizontal mechanical center line to cut the surface of a round rod-like work; and a feed mechanism configured to hold the work on the mechanical center line between upper and lower feed rollers and feed the work to the cutter head, the feed mechanism includes: a first holder configured to rotatably support the lower feed roller and have an upwardly-extended first frame further than the upper feed roller; a second holder configured to rotatably support the upper feed roller and has an upwardly-extended second frame; a roller opening/closing driving mechanism configured to be disposed between the first and second frames and vertically move the first and second frames relative to each other; a synchronizing mechanism including a pinion disposed in the same vertical plane as axes of the both feed rollers above the upper feed roller, and first and second racks that are provided in the first and second frames, respectively, and engage with both respective ends of the pinion in a work feed direction; and a grasping-force applying cylinder disposed in the roller opening/closing driving mechanism to apply a downward work grasping force to the second holder.

The peeling machine according to the present invention preferably has following configuration.

(a) Two synchronizing mechanisms are aligned in the axial direction of the pinion, in one synchronizing mechanism, the first rack is disposed on the downstream side in the work feed direction, and the second rack is disposed on the upstream side in the work feed direction, and in the other synchronizing mechanism, the first rack is disposed on the upstream side in the work feed direction, and the second rack is disposed on the downstream side in the work feed direction.

(b) The driving mechanism is a ball screw-type driving mechanism configured of a screw shaft, a plurality of ball, and a nut.

(c) A plurality of the feed mechanisms are aligned in the work feed direction.

According to the present invention, vertical opening/closing operation of the feed rollers and positioning of the feed rollers with respect to the works having different diameters can be achieved by the roller opening/closing driving mechanism rapidly and reliably. In the meanwhile, an ultimate grasping force for the work can be applied by the grasping-force applying cylinder that is separated from the roller opening/closing driving mechanism with an appropriate pressure according to the type and surface state of the work.

Since the rack pinion-type synchronizing mechanism is disposed above the upper feed roller, no offset load occurs during opening/closing operation of the rollers, resulting in that the racks and the both frames can be smoothly moved in the vertical direction. Moreover, the racks and the pinion can be disposed in the first frame to be more compact.

With the configuration (a), since the first holder supporting the lower feed roller and the second holder supporting the upper feed roller are independently driven by the pair of racks disposed on each side in the work feed direction, the load exerted on the racks and the pinion can be made uniform, preventing offset load. This can also prevent rattle and inclination of each holder during vertical movement to enable smooth vertical movement of the both holders, as well as improve durability.

With the configuration (b), the roller opening/closing driving mechanism can be disposed in first frame to be compact.

With the configuration (c), the work can be held on the mechanical center line substantially linearly without being curved and therefore, can be stably supplied without any slippage.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

FIG. 1 to FIG. 7 show a peeling machine according to the present invention, and an embodiment of the present invention will be described below with reference to these drawings.

Figure 1:
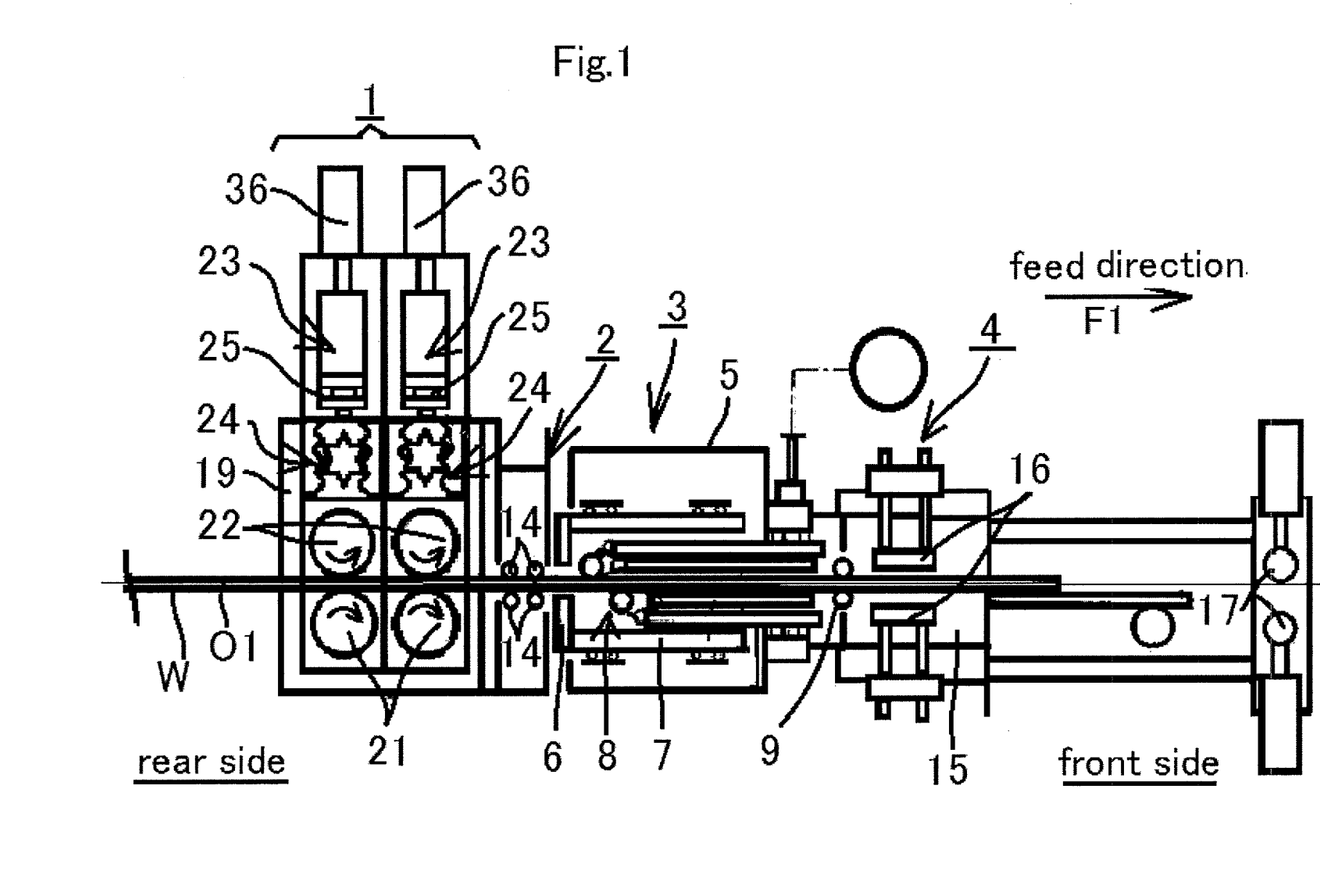
FIG. 1 is a schematic side view showing an embodiment of a peeling machine according to the present invention.

FIG. 1 is an overall schematic side view of the peeling machine. For convenience of description, a side of a work feed direction F1 is referred to as "front side" of a machine, a feed mechanism, and the like; the opposite side to the work feed direction F1 is referred to as "rear side" of the machine, the feed mechanism, and the like; the side on which the operator is located (front side in FIG. 1) is referred to as machine-operating side; and the opposite side to the machine-operating side is referred to as machine-non-operating side, in the following description.

In FIG. 1, the peeling machine includes a feed mechanism 1, a first guide roller mechanism 2, a machine body 3, and a carriage mechanism 4 in this order from the rear side toward the front side. The machine body 3 has a cutter head 6 at a rear end of a body case 5, a rotational main shaft 7 and a second guide roller mechanism 8 in the body case 5, and a third guide roller mechanism 9 in a vicinity of a front end of the body case 5. The cutter head 6 is fixed to a rear end of the rotational main shaft 7, and the rotational main shaft 7 is rotated at a predetermined rotational speed by a driving motor not shown to cause the cutter head 6 to integrally rotate about a mechanical center line O1.

Although described later in detail, the feed mechanism 1 includes two front and rear pairs of lower feed rollers 21 and upper feed rollers 22, which are vertically opposed to each other" so as to align in the work feed direction F1. There are further provided ball screw driving mechanisms 23 that are roller opening/closing driving mechanisms for vertically opening/closing the both feed rollers 21, 22 and rack pinion-type synchronizing mechanisms 24 that are synchronizing mechanisms for vertically moving the both feed rollers 21, 22 in synchronization with each other. There is further provided hydraulic grasping-force applying cylinders 25 that are mechanisms for applying a work grasping force of the both feed rollers 21, 22. An outer peripheral surface of each of the feed rollers 21, 22 has a V-like cross section and many protrusions. The feed rollers 21, 22 hold the round rod-like work W from the upper and lower sides to fix the work W so as not to rotate in the work circumferential direction, and rotate in directions of arrows of the feed rollers 21, 22 to feed the work W into the first guide roller mechanism 2 and the cutter head 6.

The first guide roller mechanism 2 includes two front and rear pairs of vertically opposed guide rollers 14, and guides the work W such that its axis matches the mechanical center line O1. The guide roller mechanism 2 can move in the horizontal direction perpendicular to the work feed direction F1 to pull the work between the cutter head 6 and the feed mechanism 1 toward the machine-operating side.

The carriage mechanism 4 includes a pair of upper and lower clampers 16 mounted on a moving table 15, and pinch rollers 17 disposed at the front end. The clampers 16 hold the processed work W therebetween, move forward with the moving table 15 in synchronization with the feeding speed of the feed mechanism 1, release the work W at the terminal end and then, return to a rear movement start position. The pinch rollers 17 hold the work W therebetween after the work W is released from the feed mechanism 1, and discharge the work W forward at high speed.

Figure 2:
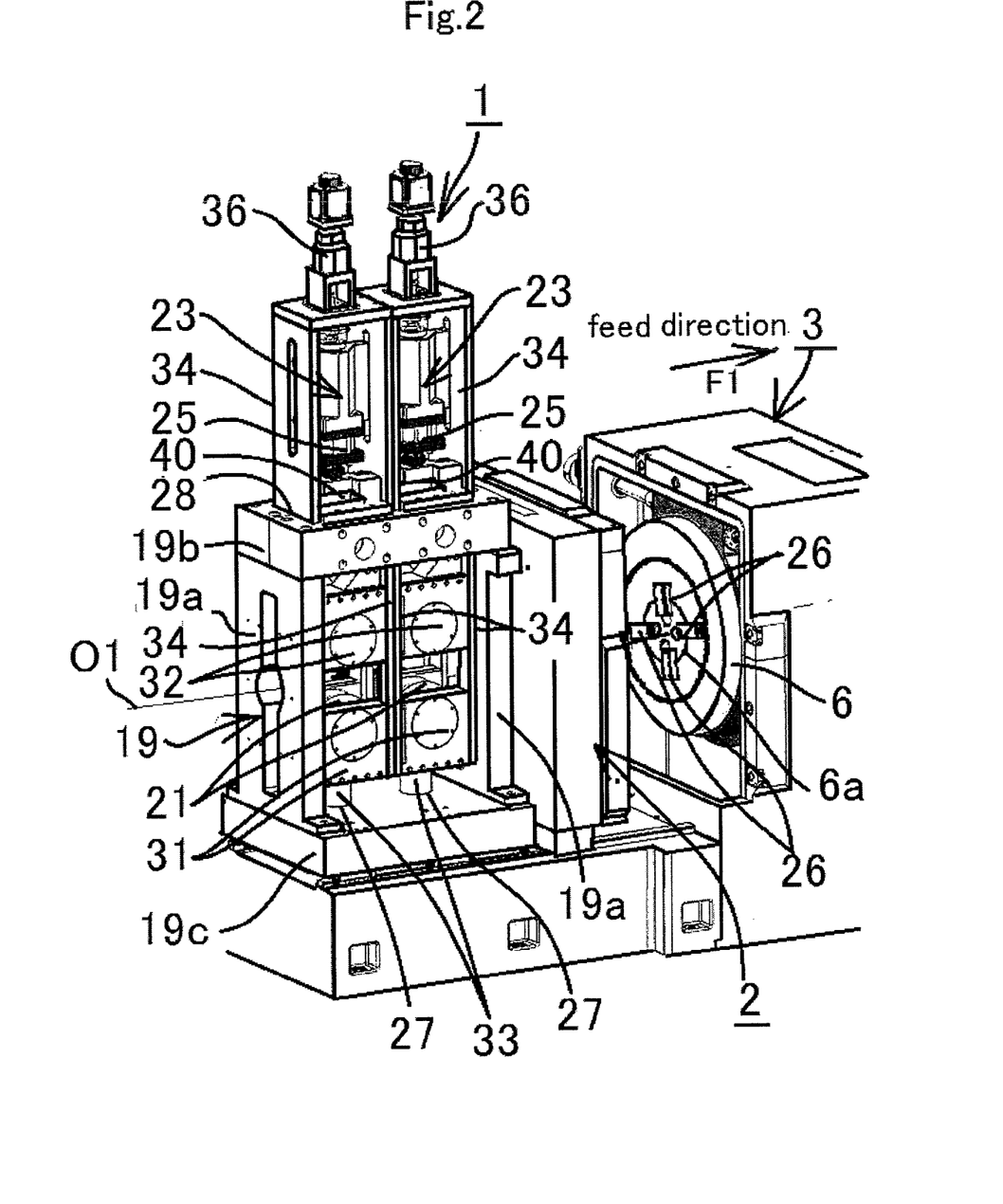
FIG. 2 is a perspective view of a feed mechanism, a first guide roller mechanism, and a cutter head of the peeling machine in FIG. 1.

FIG. 2 is the perspective view of the feed mechanism 1, the first guide roller mechanism 2, and the cutter head 6. The cutter head 6 includes a plurality of cutting tools 26 disposed around a work passage hole 6a centering on the mechanical center line O1 at regular intervals in the circumferential direction, and each of the cutting tools 26 can rotate about the mechanical center line O1 integrally with the cutter head 6, and move in the radial direction of the cutter head 6.

A configuration of the feed mechanism 1 will be described in detail. In FIG. 2, a case 19 of the feed mechanism 1 has a pair of front and rear vertical walls 19a, an upper wall 19b, a bottom wall 19c in an integral manner, lower guide holes 27 each having a circular cross section are formed in the bottom wall 19c, and rectangular upper guide holes 28 in a plan view are formed in the upper wall 19b.

In the case 19, first holders 31 that rotatably support the lower feed rollers 21 and second holders 32 that are disposed above the first holders 31 and rotatably support the upper feed rollers 22 (FIG. 1) are disposed to be vertically movable with respect to the case 19.

The first holders 31 each have a guide rod 33 extending downward from the lower surface of the first holder 31 and a first frame 34 extending upward from both of the front and rear surfaces of the first holder 31 in an integral manner. The guide rod 33 engages with the lower guide hole 27 formed in the case bottom wall 19c so as to be vertically movable, and the first frame 34 penetrates the upper guide holes 28 formed in the case upper wall 19b so as to be vertically movable, and protrudes upward. An electric motor 36 for driving the roller opening/closing driving mechanism 23 is provided on the upper wall of the first frame 34. The roller opening/closing ball screw driving mechanism 23 is stored in the upper half of the first frame 34, and is coupled to the electric motor 36 to transmit power.

Figure 3:
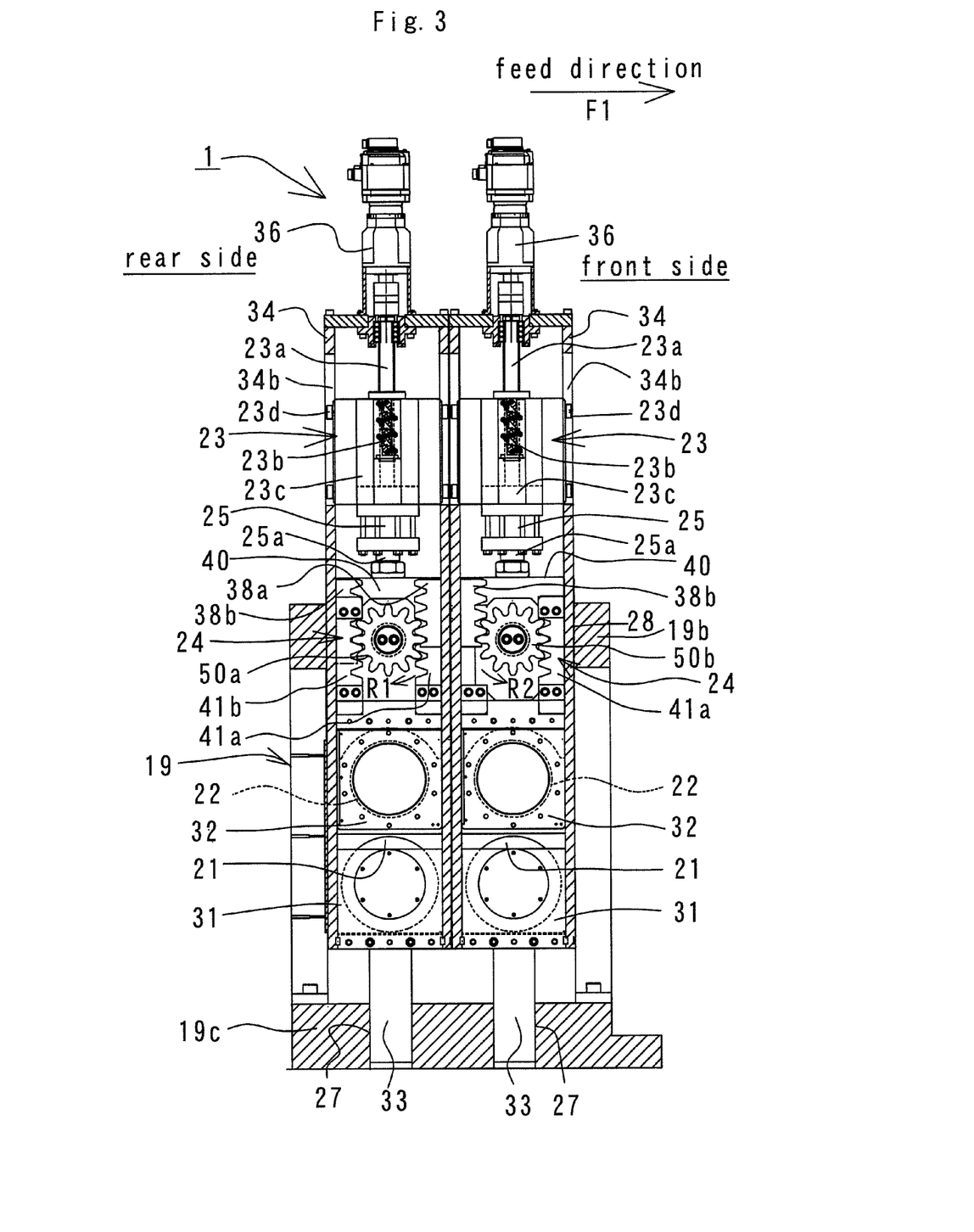
FIG. 3 is a partial sectional side view of the feed mechanism in a roller closed state.
Figure 4:
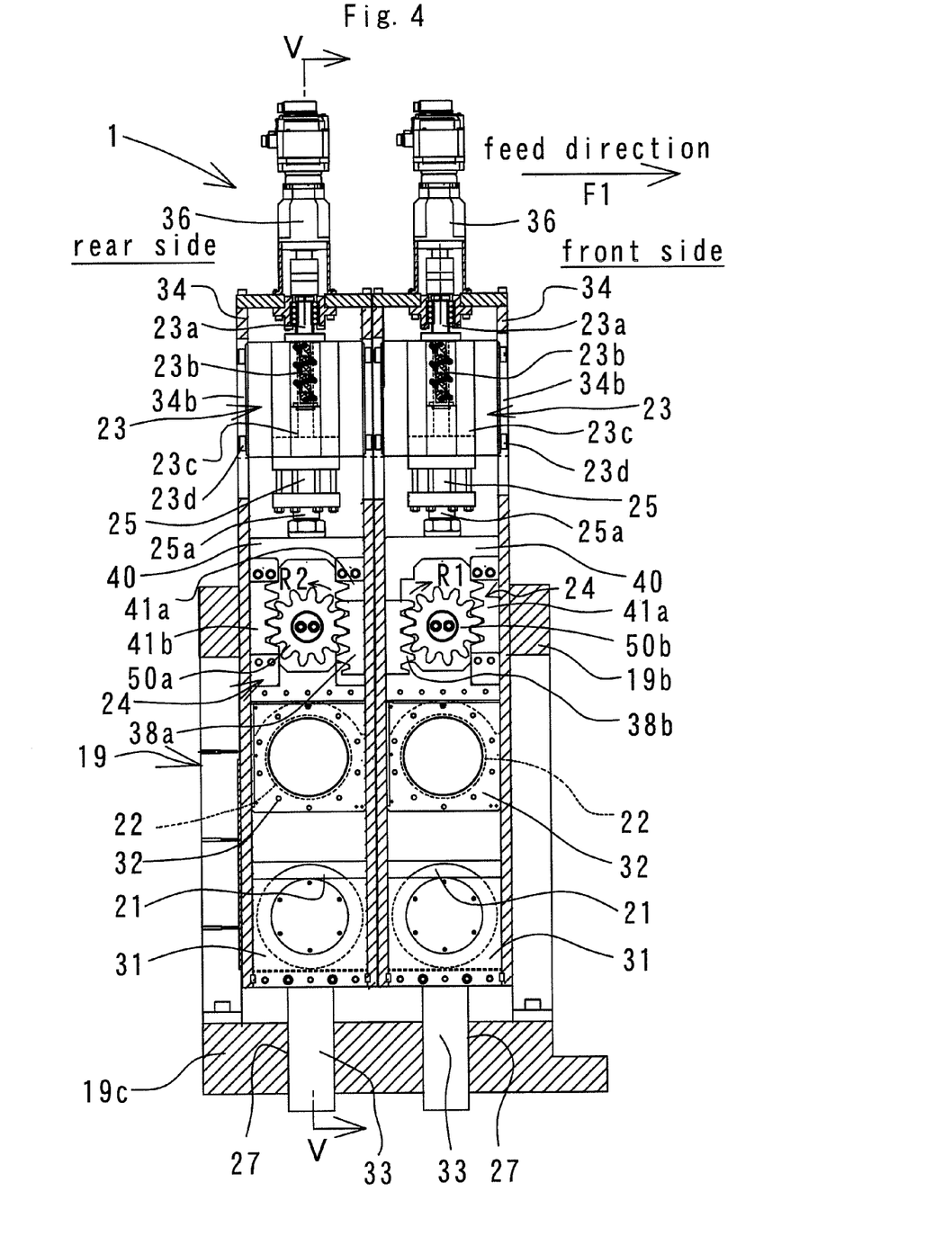
FIG. 4 is a partial sectional side view of the feed mechanism in a roller opened state.
Figure 5:
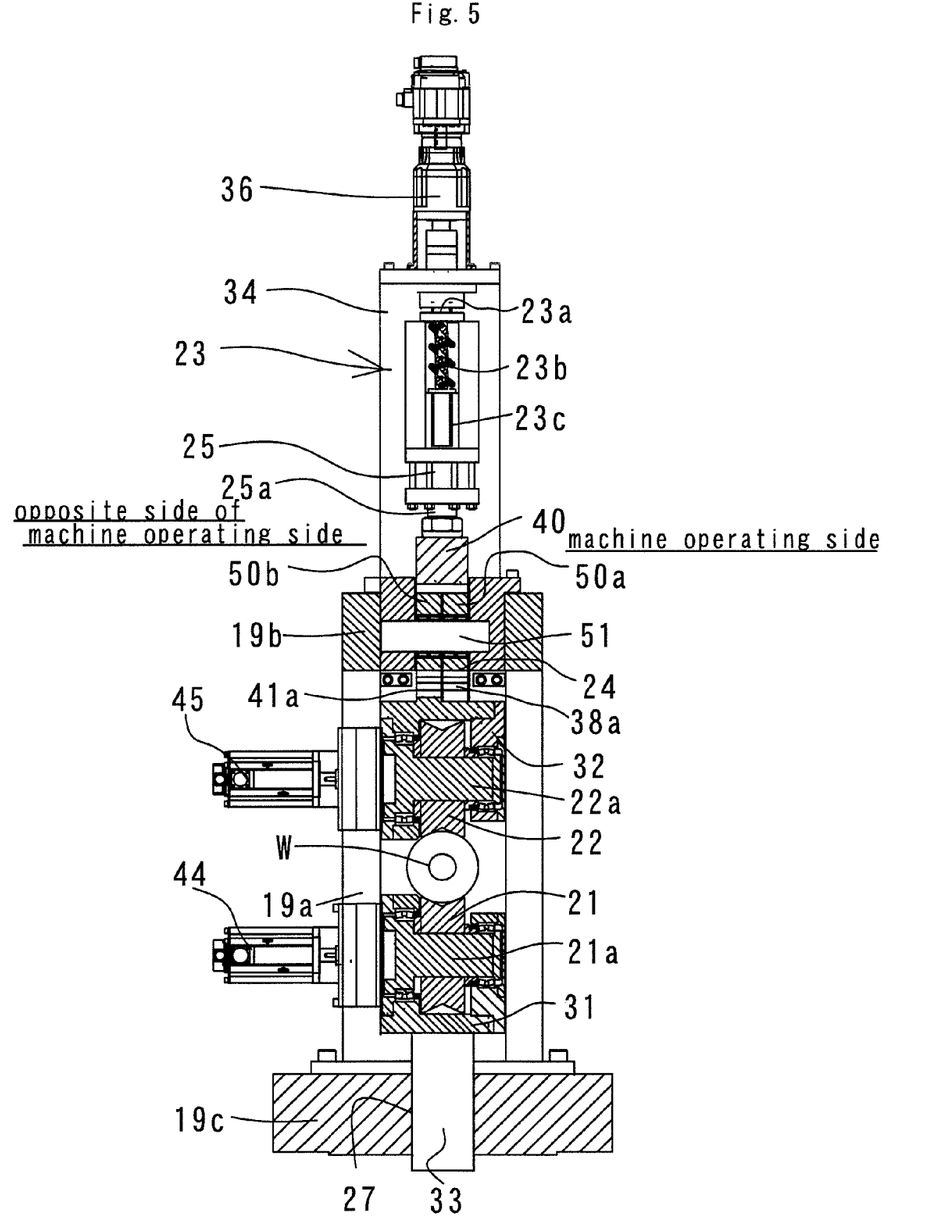
FIG. 5 is a sectional view taken along V-V in FIG. 4.
Figure 6:
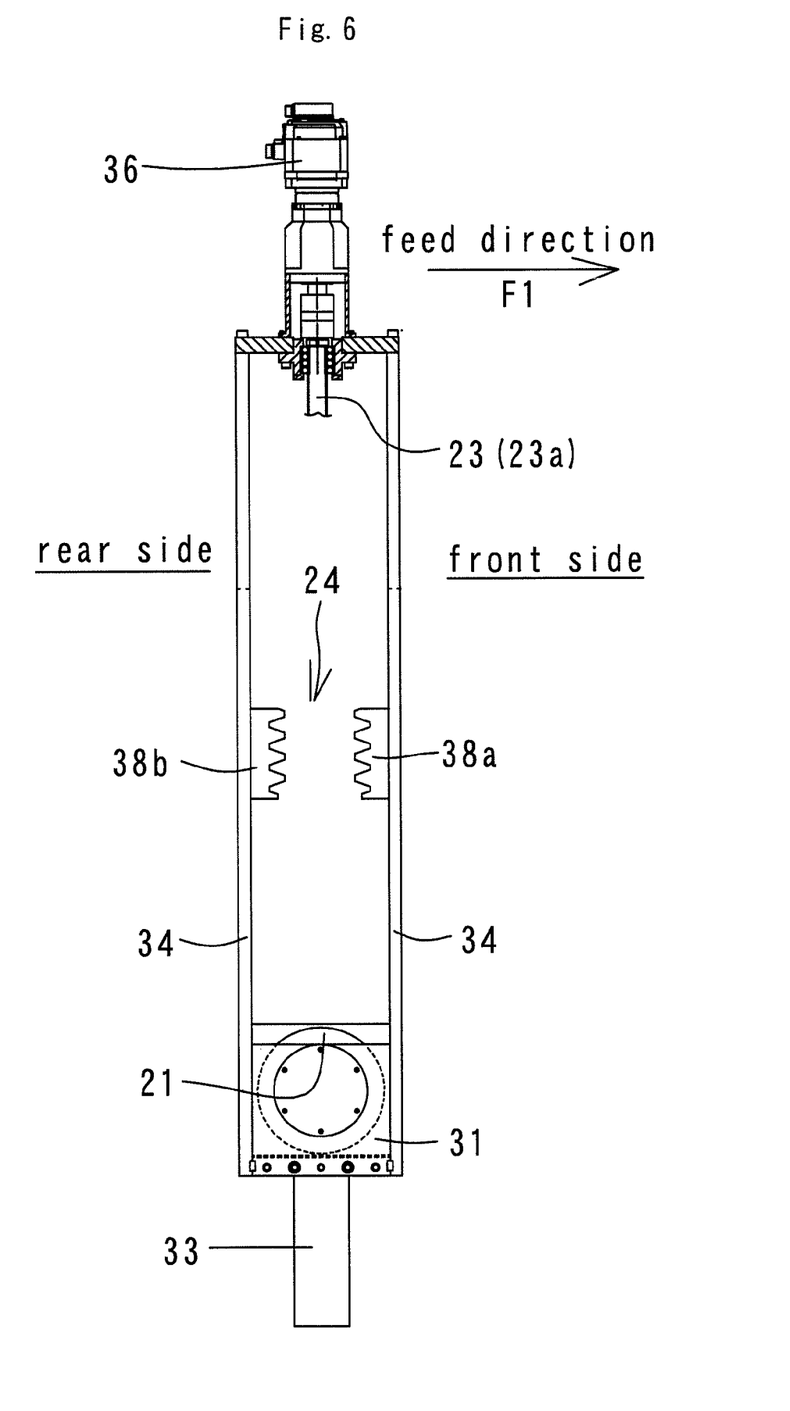
FIG. 6 is a side view of a first holder of a lower feed roller.
Figure 7:
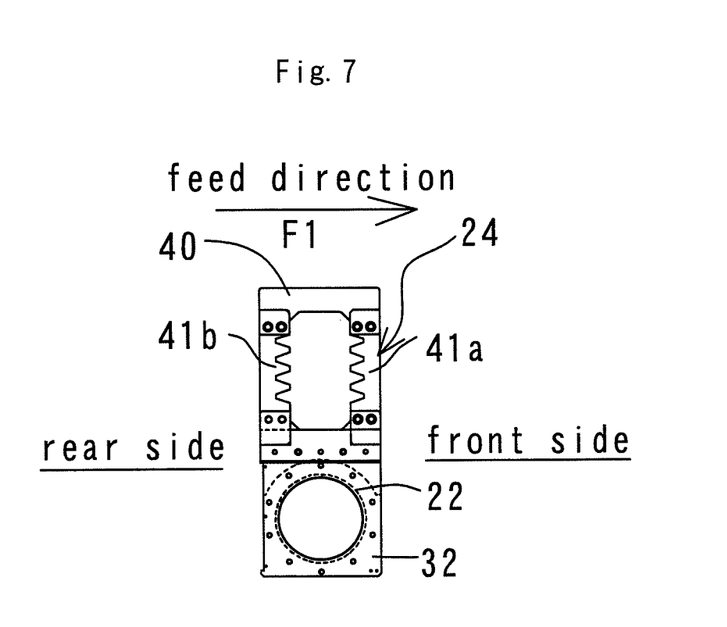
FIG. 7 is a side view of a second holder of a upper feed roller.

FIG. 3 and FIG. 4 are side views showing the feed mechanism 1 in the roller closed state and the roller opened state, respectively; FIG. 5 is a sectional view taken along V-V in FIG. 4; FIG. 6 is a side view of the single first holder 31; and FIG. 7 is a side view of the single second holder 32. In FIG. 6, a first rack 38a on the front side and a first rack 38b on the rear side, which constitute the rack pinion-type synchronizing mechanism 24, are provided on the front and rear vertical walls of the first frame 34, respectively. Both the first racks 38a, 38b are disposed as opposed to each other in the front-rear direction in a side view. However, the first racks 38a, 38b are apart from each other in the axial direction of the lower feed roller 21. Specifically, the first rack 38a on the front side is disposed closer to the machine-operating side in the roller axial direction than the first rack 38b on the rear side. A screw shaft 23a of the ball screw driving mechanism 23 is coupled to an output at the lower end of the electric motor 36, and extends downward.

In FIG. 7, the second holder 22 that supports the upper feed roller 22 is provided with a second frame 40 extending upward, and a second rack 41a on the front side and a second rack 41b on the rear side, which constitute the rack pinion-type synchronizing mechanism 24, are provided on the front and rear vertical walls of the second frame 40, respectively. Both the second racks 41a, 41b are disposed as opposed to each other in the front-rear direction in a side view. However, the second racks 41a, 41b are apart from each other in the axial direction of the upper feed roller 22. Specifically, the second rack 41a on the front side is disposed closer to the machine-nonoperating side in the roller axial direction than the second rack 41b on the rear side. That is, the second racks are disposed opposite to the first racks 38a, 38b of the first frame 34 (FIG. 7) in the roller axial direction.

In FIG. 5, a shaft 21a of the lower feed roller 21 and a shaft 22a of the upper feed roller 22 are rotatably supported through their bearings by the first holder 31 and the second holder 32, respectively, and protrude to the machine-nonoperating side. Driving motors 44, 45 for rotating the feed rollers 21 and 33 are fixed to end surfaces of the holders 31, 32 on the machine nonoperating side, and output shafts of the driving motors 44, 45 are coupled to the respective shafts 21a, 22a of the feed rollers 21, 22. That is, the four feed rollers 21, 22 in total can be independently driven by the coupled driving motors 44, 45.

The screw shaft 23a of the ball screw driving mechanism 23 is screwed into a moving nut 23c disposed in the first frame 34 via a plurality of balls 23b. When the screw shaft 23a is rotated in one direction, due to the screw feeding action, the moving nut 23c lowers relative to the first frame 34 to close the both feed rollers 21, 22. When the screw shaft 23a is rotated in the other direction, the moving nut 23c rises relative to the first frame 34 to open the both feed rollers 21, 22.

The grasping-force applying cylinder 25 is fixed to the lower end surface of the moving nut 23c. A rod 25a of the grasping-force applying cylinder 25 faces downward, can be freely expanded/contracted, and is coupled to the upper end of the second frame 40 of the upper feed roller 22. An expansion/contraction stroke of the rod 25a only needs to be enough large to apply the grasping force, and for example, a small stroke of 20 mm is sufficient. By providing such grasping-force applying cylinder 25, due to the action of the ball screw driving mechanism 23 as described above, the second frame 40 of the upper feed roller 22 vertically moves relative to the first frame 34, and further, due to expansion/contraction of the rod 25a of the grasping-force applying cylinder 25, vertically moves relative to a nut 23c even with the small stroke.

A pinion support shaft 51 of the rack pinion-type synchronizing mechanism 24 is fixedly attached to the upper wall 19b of the case 19, and is disposed such that its axis is located in the same vertical plane as the plane where the axes of the feed rollers 21, 22 are located, and is parallel to the both axes of the feed rollers 21, 22. A pair of pinions 50a, 50b constituting the synchronizing mechanism 24 is provided on the pinion support shaft 51 to be adjacent to each other in the axial direction of the pinion support shaft 51, and are rotatably supported by the pinion shaft 51 via their bearings. The front end of the pinion 50a on the machine-operating side engages with the first rack 38a on the front end, and the front end of the pinion 50b on the machine-nonoperating side engages with the second rack 41a on the front side.

In FIG. 3, the second holders 32 and the second frames 40 that support the upper feed rollers 22 can rise and lower with respect to the case 19, and can also vertically move with respect to the first holders 31 and the first frames 34 that support the lower feed rollers 21.

Guide pins 23d are provided at the same vertical positions on the front and rear side surfaces of the nut 23c of the ball screw driving mechanism 23, and engage with long holes 34b formed in the front and rear vertical walls of the first frame 34 to be vertically slidable. That is, engagement between the guide pins 23d and the long holes 34b restricts horizontal movement of the nut 23c.

In FIG. 3 and FIG. 4, for easy understanding of the dual structure of the rack pinion-type driving mechanisms 23, the feed mechanism 1 on the front side is shown in a situation that the pinion 50a on the machine-operating side and the racks 38a, 41b are omitted. As shown in the feed mechanism 1 on the rear side, the first rack 38a on the front side of the first frame 34 engages with the front end of the pinion 50a on the machine-operating side, and the first rack 41b on the rear side of the second frame 40 engages with the rear end of the pinion 50a on the machine-operating side. As shown in the feed mechanism 1 on the front side, the second rack 41a on the front side of the second frame 40 engages with the front end of the pinion 50b on the machine-nonoperating side, and the first rack 38b on the rear side of the first frame 34 engages with the rear end of the pinion 50b on the machine-nonoperating side.

In the rack pinion-type synchronizing mechanisms 24 having the dual structure, when the pinions 50a, 50b are rotated from the closed state in FIG. 3 in a direction of an arrow R1 and in a direction of an arrow R2, respectively, the first frames 34, the first holders 31, and the lower feed rollers 21 lower, and in synchronization with this, the second frames 40, the second holders 32, and the upper feed rollers 22 rise. That is, both feed rollers 21, 22 are opened as shown in FIG. 4.

Conversely, when the pinions 50a, 50b are rotated from the opened state in FIG. 4 in the direction of the arrow R2 and the direction of the arrow R1, the first frames 34, the first holders 31, and the lower feed rollers 21 rises and in synchronization with this, the second frames 40, the second holders 32, and the upper feed rollers 22 lower. That is, the both feed rollers 21, 22 are closed as shown in FIG. 3.

[Actions or Operations]

The overall actions of the peeling machine will be briefly described below.

(1) In FIG. 1, for example, the round rod-like work W of about 6 m length is supplied. The work W is supplied from a rear work station to the feed mechanism 1 one by one, and is vertically caught between the two pairs of feed rollers 21, 22 rotating at a predetermined rotational speed, thereby being fed toward the front (feed direction F1) at a predetermined speed. At this time, circumferential rotation of the work W itself is prevented by the feed rollers 21, 22.

(2) The work is fed from the feed mechanism 1 to first guide roller mechanism 2, is guided by the upper and lower guide rollers 14 such that the axis (mechanical center line O1) of the cutter head 6 matches the axis of the work and then, is fed into the cutter head 6.

(3) In FIG. 2, in the cutter head 6, the outer peripheral surface of the work W in the work insertion hole 6a is continuously cut with the cutting tools 26 of the rotating cutter head 6, and mill scale is peeled off. After cutting, the work W reaches the second guide roller mechanism 8 in FIG. 1, is fed forward while being grasped by each guide roller, and is further grasped by the third guide roller mechanism 9 to be fed into the carriage mechanism 4.

[Action of Feed Mechanism 1]

In FIG. 3 and FIG. 4, opening/closing of the feed rollers 21, 22 and grasping of the work are made by a series of operations of the electric motors 36, the roller opening/closing ball screw driving mechanisms 23, the grasping-force applying cylinders 25, and the rack pinion-type synchronizing mechanisms 25.

In the roller opened state shown in FIG. 4, the nuts 23c of the ball screw driving mechanisms 23 are elevated, and the rods 25a of the grasping-force applying cylinders 25 are contracted. When the electric motors 36 are rotated in one direction from the roller opened state in FIG. 4, the nuts 23c of the ball screw driving mechanisms 23 lower relative to the first frames 34 and accordingly, the cylinders 25, the upper second frames 40, and the second racks 41a, 41b lower relative to the first frames 34. The second racks 41a, 41b lowers, such that the pinion 50a on the machine-operating side rotates in the direction of the arrow R2 and the pinion 50b on the machine-nonoperating side rotates in the direction of the arrow R1. As a result, the first racks 38a, 38b of the first frames 34 rise in synchronization with the second frames 32 and the second rack 41a, 42a. In summary, the first holders 31 and the lower feed rollers 21, and the second holders 32 and the upper feed rollers 22 vertically move substantially symmetrically about a horizontal plane passing the axes of the pinions 50a, 50b, closing the both feed rollers 21, 22.

When the both feed rollers 21, 22 are closed to a grasped position predetermined according to the diameter of the work W, the electric motors 36 stop, the rods 23a of the grasping-force applying cylinders 25 expand, and the upper feed rollers 22 press downward the upper part of the outer peripheral surface of the work W by a grasping force having a predetermined pressure. That is, the work W is grasped by the upper and lower feed rollers 21, 22 with the predetermined pressure.

To release the work W from the grasped state, first, the rods 25a of the grasping-force applying cylinders 25 are raised from the closed state in FIG. 3 to release the grasped state of the work W. Subsequently, by rotating the electric motors 36 in the other direction, the nuts 23c of the ball screw driving mechanisms 23 are raised relative to the first frames 34. This raises the cylinders 25, the upper second frames 40, the second racks 41a, 41b relative to the first frames 34. The second racks 41a, 41b rise, such that the pinion 50a on the machine-operating side rotates in the direction of the arrow R1 in FIG. 3 and the pinion 50b on the machine-nonoperating side rotates in the direction of the arrow R2. As a result, the first racks 38a, 38b of the first frames 34 lower in synchronization with the second frames 40 and the second racks 41a, 42a. In summary, the first holders 31 and the lower feed rollers 21, and the second holders 32 and the upper feed rollers 22 vertically move substantially symmetrically about a horizontal place passing the axes of the pinions 50a, 50b, opening the both feed rollers 21, 22.

Effects of Embodiment (1) In FIG. 3 and FIG. 4, synchronizing opening/closing and positioning of the feed rollers 21, 22 with respect to the works W of different diameters are performed by the electric motors 36, the roller opening/closing ball screw driving mechanisms 23, and the rack pinion-type synchronizing mechanisms 24, and independently from the opening/closing, the ultimate grasping operation is performed by the grasping-force applying cylinders 25. Whereby, opening/closing and positioning can be achieved rapidly and reliably, and the work W can be ultimately grasped with the appropriate pressure according to the work by the cylinders 25.

(2) In FIG. 3 and FIG. 4, the pinions 50a, 50b are disposed such that axes of the pinions 50a, 50b are located in the same vertical plane as axes of the upper and lower feed rollers 21, 22, and the racks 38a, 41b or 41a, 38b are engaged with both ends of the pinions 50a, 50b in the feed direction. Whereby, no offset load on the pinions 50a, 50b and the racks 38a, 41b or 41a, 38b during opening/closing. As a result, the racks 38a, 38b, 41a, and 41b can be smoothly moved and further, the entire rack pinion-type synchronizing mechanisms 24 can be disposed in the first frames 34 to be more compact.

(3) The first holders 31 supporting the lower feed rollers 21 and the second holders 32 supporting the upper feed rollers 22 are moved by the pair of racks 38a, 38b, 41a, and 41b disposed on both sides in the work feed direction. Whereby, rattle and inclination of the holders 31, 32 during movement can be prevented, and the both holders 31, 32 can smoothly move in the vertical direction in a stable state.

(4) Since the roller opening/closing ball screw driving mechanisms 23 are disposed above the upper feed rollers 22, the driving mechanisms 23 can be disposed in the first frame 34 to be more compact.

(5) Since the feed mechanisms 1 are aligned in two rows in the work feed direction, the work W can be held on the mechanical center line O1 substantially linearly, and be stably supplied without any slippage.

Other Embodiment (1) In the embodiment, the pair of pinions 50a, 50b, the pair of lower roller racks 38a, 38b, and the pair of upper roller racks 41a, 41b are axially displaced from the feed mechanism 1 including the pair of feed rollers 21, 22 as shown in FIG. 5. However, according to the present invention, at least one pinion, one upper feed roller rack, and one lower feed roller only need to be provided for one feed mechanism including the pair of feed rollers 21, 22.

(2) The present invention is not limited to the configuration of the embodiments, and may be variously modified within the scope of Claims.

What is claimed is:

1. A peeling machine comprising:
a cutter head configured to rotate about a substantially horizontal mechanical center line to cut a surface of a round rod-like work; and
a feed mechanism configured to hold the work on the mechanical center line between upper and lower feed rollers and feed the work to the cutter head, wherein
the feed mechanism includes:
a first holder configured to rotatably support the lower feed roller and have an upwardly-extended first frame further than the upper feed roller;
a second holder configured to rotatably support the upper feed roller and has a upwardly-extended second frame;
a roller opening/closing driving mechanism configured to be disposed between the first and second frames and vertically move the first and second frames relative to each other;
a synchronizing mechanism including a pinion disposed in the same vertical plane as axes of the both feed rollers above the upper feed roller, and first and second racks that are provided in the first and second frames, respectively, and engage with both respective ends of the pinion in a work feed direction; and
a grasping-force applying cylinder disposed in the roller opening/closing driving mechanism to apply a downward work grasping force to the second holder,
wherein
two synchronizing mechanisms are aligned in an axial direction of the pinion,
in one synchronizing mechanism, the first rack is disposed on the downstream side in the work feed direction, and the second rack is disposed on the upstream side in the work feed direction, and
in the other synchronizing mechanism, the first rack is disposed on the upstream side in the work feed direction, and the second rack is disposed on the downstream side in the work feed direction.

2. The peeling machine according to claim 1, wherein the driving mechanism is a ball screw-type driving mechanism configured of a screw shaft, a plurality of balls, and a nut.

3. The peeling machine according to claim 1, wherein a plurality of feed mechanisms are aligned in the work feed direction.

* * * * *